United States Patent [19]
Oppermann et al.

[11] Patent Number: 5,636,563
[45] Date of Patent: Jun. 10, 1997

[54] BREWING DEVICE FOR A DOMESTIC ESPRESSO MAKER

[75] Inventors: Günter Oppermann, Dietzenbach; Manfred Klawuhn, Frankfurt am Main, both of Germany

[73] Assignee: Braun Aktiengesellschaft, Kronberg, Germany

[21] Appl. No.: 529,005

[22] Filed: Sep. 15, 1995

[30] Foreign Application Priority Data

Oct. 10, 1994 [DE] Germany .................. 44 36 080.0

[51] Int. Cl.$^6$ ................................. A47J 31/34
[52] U.S. Cl. ............... 99/285; 99/297; 99/298; 99/302 P
[58] Field of Search ............ 99/285, 287, 295, 99/297, 298, 300, 302 P, 302 R; 426/433

[56] References Cited

U.S. PATENT DOCUMENTS

| | | |
|---|---|---|
| 1,774,980 | 9/1930 | Lambert . |
| 4,763,566 | 8/1988 | Paoletti . |
| 4,796,521 | 1/1989 | Grossi et al. ............ 99/287 |
| 4,797,296 | 1/1989 | Meier et al. ............ 99/302 P |
| 5,255,594 | 10/1993 | Grossi ..................... 99/302 P |

FOREIGN PATENT DOCUMENTS

| | | |
|---|---|---|
| 373483 | 1/1984 | Austria . |
| 4026495A1 | 8/1990 | Germany . |

*Primary Examiner*—Reginald Alexander
*Attorney, Agent, or Firm*—Fish & Richardson, P.C.

[57] ABSTRACT

A brewing device for a domestic espresso maker includes a brewing chamber adapted to be filled with coffee grounds. The brewing chamber has on its outlet side a filtering means and on its inlet side a piston entering the brewing chamber along the wall thereof and closing the chamber, so that water arriving from a source of pressure is forced into the brewing chamber. The water subsequently flows out of the brewing chamber at the end close to the filtering means as an espresso beverage. In the path of flow of the water, a safety device responsive to a critical pressure in the pressure system is provided between the source of pressure and the brewing chamber. In the presence of pressures prevailing under normal operating conditions, the outlet orifice is outside the brewing chamber; in the presence of a pressure exceeding a critical value, a displacement of the piston relative to the wall of the brewing chamber occurs, such as to cause the outlet orifice to become part of the brewing chamber.

7 Claims, 1 Drawing Sheet

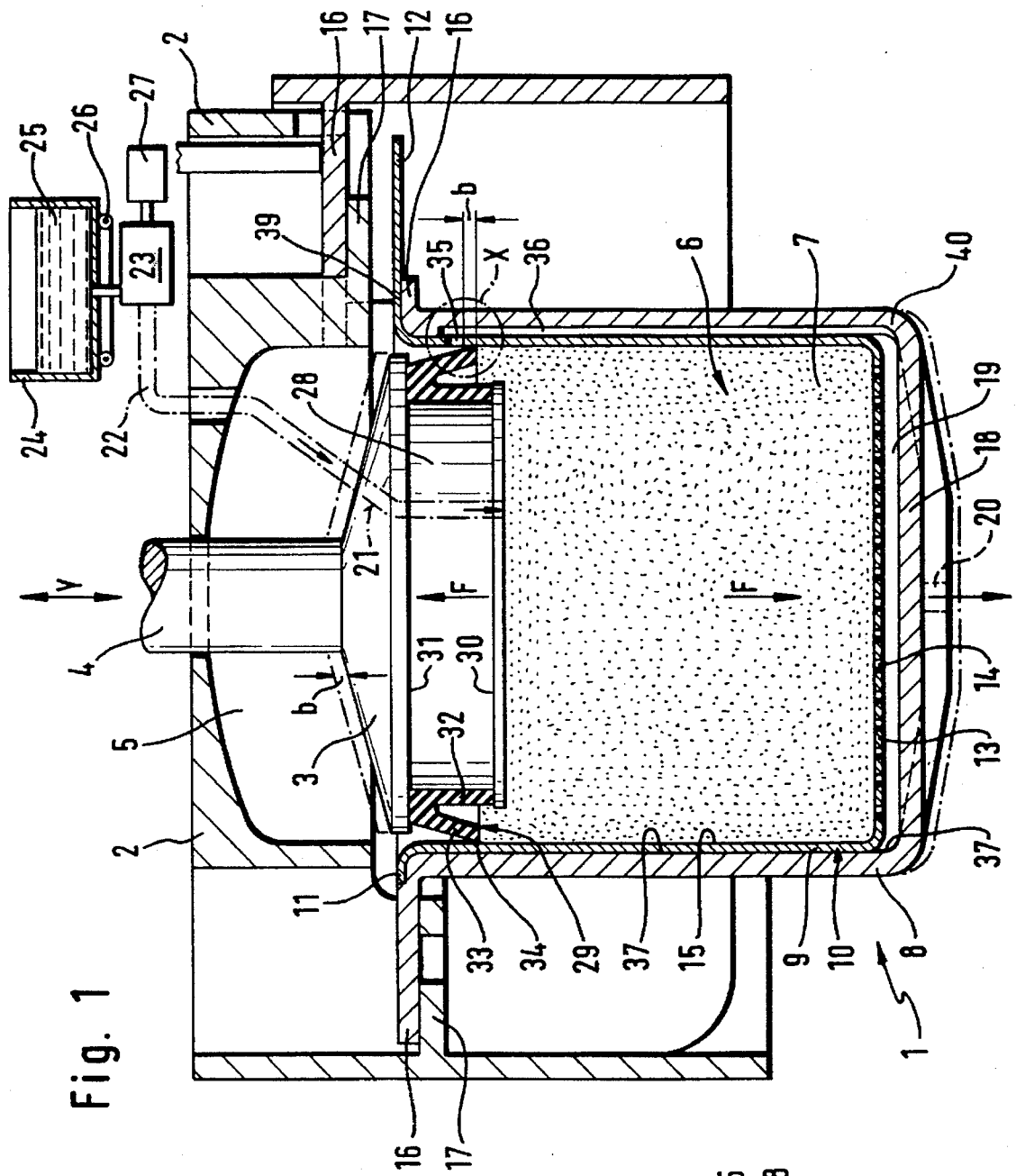
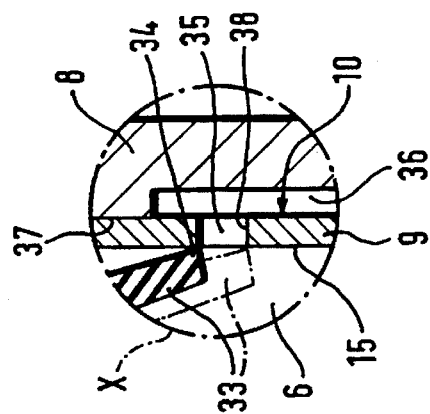
Fig. 1
Fig. 2

BREWING DEVICE FOR A DOMESTIC ESPRESSO MAKER

This invention relates to a brewing device for a domestic espresso maker, with a brewing chamber adapted to be filled with coffee grounds and comprising on its outlet side a filtering means and on its inlet side a piston entering the brewing chamber along the wall thereof and closing the chamber, so that water arriving from a source of pressure is adapted to be forced into the brewing chamber, the water subsequently flowing out of the brewing chamber at the end close to the filtering means as an espresso beverage, extracting the coffee grounds in the process.

A brewing device of this type suitable for use in a domestic espresso maker is already known from U.S. Pat. No. 1,774,980. In this espresso maker, hot water is drawn by a pump driven by an electric motor, compressed and delivered to a brewing chamber adapted to be filled with coffee grounds. In dependence upon the degree of fineness and tamping of the coffee grounds, excessive pressure may occur in the pump pressure system, involving the risk of damage to the pump system or exposing the seals of the brewing device to increased loads.

It is an object of the present invention to devise a brewing device for a domestic espresso maker which avoids the above-mentioned disadvantages and by means of which the pressure in the pump circuit does not exceed a critical value, independently of the motor and pump power ratings. At the same time, it is desirable that the requisite means for controlling the pressure afford ease and economy of implementation.

The invention eliminates the need for additional components for the safety device, so that no extra expense is thereby incurred. Only the configuration of the outlet orifice connecting the brewing chamber to atmosphere involves some expenditure which, however, is in particular all the lower by forming the channel integral with the wall in the manufacture of the brewing chamber. However, manufacturing the outlet orifice in a machining operation such as drilling, punching, etc. may also be contemplated. The brewing chamber may be formed by the filter basket holder itself or by a separate filter basket insertable into the filter basket holder. By virtue of the present invention, the piston serves not only as a closure means closing the brewing chamber, but also serves the added function of a control means or control member for the outlet orifice. Diameters of a magnitude below 1 mm are already sufficient for the size of the outlet orifice in order to reduce the pressure in the brewing chamber to the maximum permissible value in a minimum of time. As soon as excess pressure is reduced, that is, as soon as the pressure has returned to the maximum permissible value, the outlet orifice ceases to be part of the brewing chamber, meaning that the piston, as a result of the relative displacement, separates the brewing chamber again from the outlet orifice. The displacement of the piston relative to the brewing chamber invariably involves a volumetric change of the brewing chamber which is the result of the forces acting on the piston or on the brewing chamber and the attendant elastic deformation of the components concerned.

An appreciable elastic deformation of the components is accomplished in particular if the components involved in the elastic deformation are made of plastics at least in part or wholly, because plastics material as, for example, polypropylene, affords particularly good elastic expansion in the presence of comparatively low loads. The requisite paths for communication of the outlet orifice with the brewing chamber between the piston and the wall of the brewing chamber are accomplished readily. Further, it is advantageous to provide at suitable locations on the components contributing to relative displacement elastic expansion joints or other shaped configurations conducive to expansion on force application, in order to thus accomplish an intentional displacement of the piston relative to the wall of the brewing chamber in dependence upon the pressure, such displacement being invariably cancelable again when the application of pressure ceases.

A displacement of the piston relative to the brewing chamber can also be accomplished by the utilization of spring means in the brewing device. However, this necessitates additional components which would necessarily incur higher cost.

A relative displacement can be produced either by the piston only, or by the brewing chamber, or by both. A displacement relative to the wall of the brewing chamber that is largely performed by the piston only as pressure increases requires an extremely stable supporting structure for the filter basket holder which is then preferably made of steel, cast steel, or aluminum. Advantages resulting therefrom are in particular the sliding action between the piston and the bore in the brewing chamber, because these components extend relatively concentrically with each other also under pressure, that is, they stay in alignment or maintain their centered relationship. This is substantially true in cases where essentially only the wall of the brewing chamber is displaced relative to the piston when pressure is increased. In this arrangement, the brewing head provided with the piston is of a relatively stable configuration relative to the supporting structure of the brewing chamber in the domestic espresso maker.

Features of the invention result in a particularly straightforward housing configuration, because for cost reasons both components may be manufactured from the same material, preferably plastics, their strength being selected such that both portions travel jointly the distance necessary for relative displacement on the application of pressure to the brewing chamber. The cross-sections of the components are selected such that the desired maximum amount of displacement occurs precisely in the presence of maximum pressure application; in the embodiment of the present invention, this displacement travel is of the order of 4 to 5 mm, approximately.

By means of a ring seal provided on the piston, the sealing surface between the piston and the brewing chamber can be determined accurately, thus enabling also the outlet orifice to be located accurately relative to the brewing chamber, in order to thus specify with relative precision the length of travel in which the brewing chamber is opened towards the outlet orifice. Sealing rings made of rubber or plastics and known for use with pistons, such as gaskets or square rings, have proven to be particularly successful.

The brewing chamber is formed by a filter basket insertable into the filter basket holder and having perforations at the bottom thereof. In this configuration, the outlet orifice can be provided in the sheet metal wall with particular ease as by punching or drilling, for example. The filter basket holder may also be manufactured from a less solid material, such as plastics, whereas the brewing chamber proper is of an extremely sturdy configuration, being made, for example, from stainless steel.

As soon as communication is established between the brewing chamber and the outlet orifice which occurs when the brewing chamber is subjected to a pressure exceeding a maximum value, a coffee-with-water beverage containing coffee grounds will be discharged on the outside of the wall of the brewing chamber. In order to prevent this mixture from unnecessarily soiling the brewing device, depositing somewhere in the brewing device to bake on there slowly, features of the invention provide for directing this mixture to the discharge port of the brewing device, where it is allowed to flow into an espresso cup placed beneath the discharge port.

According to features of the invention, it may also be contemplated to manufacture the outlet orifice in the form of a channel provided in the inner wall of the brewing chamber, with a leak resulting as the piston seal enters this outlet area, through which leak the excess pressure above the piston escapes to atmosphere. Communication between the outlet orifice and the discharge port of the brewing device may be accomplished by means of a tube or hose connection. It will be understood, of course, that the term atmosphere as used herein means that the outlet orifice may also communicate with a chamber in which a pressure prevails that is lower than the maximum pressure occurring in the brewing chamber.

An embodiment of the present invention will be described in more detail in the following with reference to the accompanying drawings. In the drawings, FIG. 1 is a partial longitudinal sectional view in the area of the brewing device, showing the piston in the interior of the brewing chamber prior to activation of the source of pressure (ready position); and FIG. 2 is a detail X, on an enlarged scale, in the area of the gasket of FIG. 1, in which the lower position of the gasket (illustrated in broken lines) identifies the position in which the maximum permissible pressure is attained in the brewing chamber, and in which the upper position of the gasket (illustrated in solid lines) designates the position in which the piston releases the full path of the outlet orifice to the brewing chamber, which corresponds to a position at which the pressure is far above the maximum permissible value or far above the critical value.

FIG. 3 is a partial longitudinal sectional view in the area of an outlet orifice in the form of a channel provided in the inner wall of a brewing chamber.

In FIG. 1, the brewing device 1 of a domestic espresso maker is comprised of an upper housing portion 2 in which a piston 3 vertically displaceable in the direction of arrows Y is adapted to slide by means of an actuating device not shown in greater detail in the drawings. The actuating device is connected to the piston 3 by means of a rod structure 4. The actuating device may be an eccentric device or other thread device operable by an operator's hand. Alternatively, the actuating device may also be an adjusting device (thread) acting directly on the piston 3 and actuated by a lever (not shown) protruding laterally from the upper housing portion 2. In the use of a thread device as an actuating device, the thread device may be comprised of the piston 3 and the upper housing portion 2, with the piston 3 being then preferably turned to effect an axial displacement.

Provided in the upper housing portion 2 is a recess 5 into which the piston 3 is retracted by means of a mechanical actuating device when it is desired to fill a brewing chamber 6 received in a cylindrical bore 37 in the lower housing portion 8 with coffee grounds 7. The brewing chamber 6 is formed by a cylindrical bore 15 which is part of the wall 9 of a filter basket 10 formed from sheet metal and having at its upper rim 11 a handle 12 projecting laterally outwardly. The filter basket 10 is a cup-shaped receptacle provided with perforations 14 in its bottom 13. The cylindrical filter basket 10 is snugly received within the cylindrical bore 37 of the lower housing portion 8 such as to enable it to be readily removed from the bore 37 for the purpose of removing spent grounds or filling it with fresh coffee grounds.

The lower housing portion 8 is a component adapted to be detached from, and to swing relative to, the upper housing portion 2, forming the filter basket holder 8 proper for the filter basket 10. The filter basket holder 8 is hinged on the upper housing portion 2 by means of a rotary axle not shown in greater detail in the drawings and includes support arms 16 in the form of portions configured in the manner of the arc of a circle by means of which the holder bears against suitable wall surfaces 17 provided on the upper housing portion 2 when in the operating position illustrated in FIG. 1. With its upper rim 11, the filter basket 10 takes support upon the upper rim 39 of the filter basket holder 8. In the operating position illustrated in FIG. 1, a clearance 19 is provided between the bottom 13 of the filter basket 10 and the bottom 18 of the filter basket holder 8, through which clearance the brew exiting, among other outlets, from the perforations 14 is delivered to a discharge port 20 (shown in broken lines) provided in the bottom 18. To collect the brew, an espresso cup (not shown) or other container is placed beneath the discharge port 20.

Extending through the piston 3 is a bore 21 communicating through a flexible conduit 22 with a pump 23 provided in the brewing device 1, the pump drawing the water 25 previously heated in a water reservoir 24 by a heating means 26 and delivering the water to the piston 3 under pressure. The pump 23 is driven by an electric motor 27. For clarity of illustration, the parts 23 to 27 are shown in the FIGURE only schematically, serving accordingly only for a better understanding.

According to FIG. 1, the piston includes an annular groove 28 serving to receive a gasket 29. The gasket is axially and radially held on the piston 3 by annular end surfaces 30, 31 laterally bounding the annular groove 28. The gasket 29 is U-shaped in cross-section, with the radially inner annular area 32 effecting a seal relative to the annular groove 28, while the radially outer area effects a seal relative to the bore 15, thus providing the sealing lip 33 proper which is in sliding engagement with the inner wall of the cylindrical bore 15 of the filter basket 10. The sealing lip 33 has at its forward end a sealing edge 34 forming the sealing surface proper with the cylindrical bore 15.

According to FIGS. 1 and 2, in the ready position of the piston 3 an outlet orifice 35 is provided in the cylindrical bore 15 above the sealing edge 34, which orifice extends through the wall 9 of the filter basket 10 as can be seen more clearly in FIG. 2. A small distance above the outlet orifice 35, a groove 36 begins which represents a recess in the inner wall 37 of the filter basket holder 8. The groove 36 extends vertically downwards along the inner wall 37, terminating in the clearance 19 at a step 40. In FIG. 1, the sealing edge 34 of the sealing lip 33 is spaced from the lower edge 38 (FIG. 2) of the outlet orifice 35 by a distance b.

The mode of operation of the brewing device of the present invention is as follows:

After the brewing chamber 6 is filled with coffee grounds 7, the filter basket holder 8 containing the filter basket 10 and occupying a swung open position out of the upper housing portion 2 about a rotary axle (not shown) can be swung back into the position illustrated in FIG. 1. An actuating device not shown in the drawings then causes the piston 3 to travel down into the brewing chamber 6 until it occupies the position illustrated in FIG. 1 (ready position). In this position, the piston 3 may just rest on the surface of the coffee grounds 7, or alternatively, a free space (not shown)

may be present between the piston 3 and the surface of the coffee grounds 7 because fewer grounds 7 are held in the brewing chamber 6. As the piston 3 enters the brewing chamber 6, the sealing edge 34 of the sealing lip 33 is in sliding engagement with the wall 9 of the cylindrical bore 15, sealing the brewing chamber 6 against atmosphere in upward direction.

When the electric motor 27 is energized, the pump 23 draws hot water 25 from the reservoir 24, the water passing through the conduit 22 and the bore 21 to reach first the upper section of the brewing chamber 6. In this process, the water 25 heated by the electric heating means 26 is fed from the reservoir 24 to the brewing chamber 6. Since the water 25 is unable to pass through the coffee grounds 7 rapidly, a desired excess pressure is produced in the brewing chamber 6 as hot water 25 continues to be supplied, causing the sealing lip 33 to be urged into engagement with the cylindrical bore 15 with a still greater force (operating position). The larger the amount of hot water 25 fed into the brewing chamber 6, the higher the pressure developing therein. In the process, more and more hot water penetrates the coffee grounds 7 in downward direction, extracting aroma and flavor from the coffee grounds until the extracted brew enters the clearance 19 through the perforations 14 whence it is directed, through the discharge port 20, into an espresso cup (not shown) placed beneath the port. The hot water forced through the coffee grounds under pressure (about 15 bar) produces an espresso with crema.

As a result of the increasing pressure in the brewing chamber 6, a force F is exerted on the surface of the piston 3 which has to be supported in the upper housing portion 2. The same applies to the downwardly acting force F which is transmitted to the coffee grounds 7 and thence through the bottom 13 to the upper rim 11 of the filter basket 10 where it is received by the support arms 16 of the filter basket holder 8. This force F is then further transmitted to the wall surface 17 into the housing of the brewing device 1 where it is received. By virtue of this force F caused by the pressure in the brewing chamber 6, an elastic deformation results in the transmission path from the piston through the rod 4 and thence through the mechanical actuating device (not shown) to the upper housing portion 2, so that the piston 3, with the pressure increasing, continues being displaced in upward direction towards the outlet orifice until the sealing edge 34 of the gasket 29 has approached the lower edge 38 of the outlet orifice 35, reducing the distance b to zero (see position of the sealing lip 33 shown in FIG. 2 in broken lines). It is also due to the elastic deformation of the filter basket holder 8 in the area of its transmission parts (not shown) tied to the housing of the brewing device 1 and integrally connected with the wall surfaces 17 that also the filter basket holder 8 is displaced downwardly when viewing the drawing, thereby causing also the lower edge 38 of the outlet orifice 35 to travel downwardly a small amount. The higher the pressure in the brewing chamber 6, the greater the elastic deformation and the larger the displacement of the piston 3 relative to the outlet orifice 35.

When the pressure in the brewing chamber 6 exceeds a critical value, the piston 3 travels with its sealing edge 34 upwards (see, for example, the upper position of the sealing lip 33 of FIG. 2) such as to release the outlet orifice 35, enabling the pressure in the brewing chamber 6 to diminish by the escape of liquid (possibly including also some coffee grounds) and/or air through the outlet orifice 35. As this occurs, the exiting mixture enters the groove 36, flowing downwards into the clearance 19 where also this mixture is allowed to drip through the discharge port 20 into an espresso cup (not shown) placed beneath the discharge port 20.

As soon as the pressure in the brewing chamber 6 has returned to the maximum permissible value or a lower value, the piston 3 travels downwardly, or the lower housing portion 8 travels upwardly, until the sealing edge 34 reaches the lower edge 38 of the outlet orifice 35, reclosing it (distance b is again reduced to zero). This movement of the piston 3 is caused by the tension forces produced as a result of the elastic deformation between the upper and the lower housing portions 2 and 8, respectively. With the pressure continuing to decrease, the distance b becomes again greater, that is, the piston 3 is moved further back into the brewing chamber 6 by the tension forces produced as a result of the elastic deformation.

After the coffee grounds 7 are extracted and brewing of the espresso beverage is completed, the pump 23 is de-energized, whereby the pressure in the brewing chamber 6 is again reduced completely. The piston 3 occupies again the initial position (distance b) relative to the outlet orifice 35 as shown in FIG. 1. This then enables the piston 3 to be moved out of the brewing chamber 6 by the actuating device (not shown). Subsequently, the filter basket holder 8 can be swung open, out of the upper housing portion 2, and the filter basket 10 can be lifted out of its engagement with the inner wall 37 of the filter basket holder 8 by means of the handle 12, for the purpose of removing the coffee grounds 7 from the brewing chamber 6.

According to FIG. 3, in an alternative embodiment the outlet orifice 35 is in the form of a channel 80 provided in the inner wall 37 of the brewing chamber. As sealing lip 33 enters this outlet area (dashed line), a leak results permitting excess pressure above the piston to escape to atmosphere. Communication between the outlet orifice and the discharge port of the brewing device may be accomplished by means of a tube or hose connection (not shown).

What is claimed is:

1. A brewing device for a domestic espresso maker, comprising:

a brewing chamber adapted to be filled with coffee grounds, said brewing chamber having an inlet side and an outlet side, a filter assembly located on said outlet side of said brewing chamber, a piston located on said inlet side of said brewing chamber, said piston closing said chamber so that pressurized water forced into the brewing chamber from the inlet side flows out of the brewing chamber at the outlet side as an espresso beverage, extracting the coffee grounds in the process, and a safety device responsive to a critical pressure in the brewing chamber having an outlet orifice communicating with atmosphere and positioned such that in the presence of pressures prevailing under normal operating conditions the piston seals said outlet orifice from the brewing chamber, and that in the presence of a pressure exceeding a critical value a displacement of the piston relative to the brewing chamber occurs, such as to cause the outlet orifice to be in fluid communication with the brewing chamber.

2. The brewing device as claimed in claim 1, wherein the piston is configured and arranged to displace elastically relative to the wall of the brewing chamber as result of forces occurring due to pressure increase in the brewing chamber.

3. The brewing device as claimed in claim 1, wherein the wall of the brewing chamber is configured and arranged to displace elastically relative to the piston as a result of forces occurring due to pressure increase in the brewing chamber.

4. The brewing device as claimed in claim 1, wherein both the piston and the wall of the brewing chamber are configured and arranged to displace elastically as a result of forces occurring due to pressure increase in the brewing chamber.

5. The brewing device as claimed in claim 1, wherein said outlet orifice comprises a bore provided in a wall of the brewing chamber, a ring seal engaging an inner surface of the wall of the brewing chamber in a pressure-tight relationship thereto is secured to the piston, said seal overtraveling the bore on relative displacement of the piston, connecting the brewing chamber to atmosphere.

6. The brewing device as claimed in claim 1, wherein said brewing chamber comprises a cup-shaped filter basket, said filter basket being insertable into a cup-shaped filter basket holder, the outlet orifice being provided in the filter basket and opening into a channel formed between the filter basket and the filter basket holder, said channel communicating with a discharge port of the brewing chamber.

7. The brewing device as claimed in claim 4, wherein said outlet orifice is formed by a groove provided on an inner wall of the brewing chamber and extending along a longitudinal axis of the brewing chamber.

* * * * *